(12) United States Patent
Nishi et al.

(10) Patent No.: US 7,848,851 B2
(45) Date of Patent: Dec. 7, 2010

(54) CONTROLLER OF WORK PIECE-CONVEYING ROBOT

(75) Inventors: Hiroji Nishi, Yamanashi (JP); Yoshitaka Ikeda, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 272 days.

(21) Appl. No.: 12/230,858

(22) Filed: Sep. 5, 2008

(65) Prior Publication Data
US 2009/0112362 A1 Apr. 30, 2009

(30) Foreign Application Priority Data
Oct. 29, 2007 (JP) ............................. 2007-280638

(51) Int. Cl.
*G05B 15/00* (2006.01)
(52) U.S. Cl. ............................. 700/264; 700/251; 901/5
(58) Field of Classification Search ................. 700/251, 700/262, 264; 901/5
See application file for complete search history.

(56) References Cited

FOREIGN PATENT DOCUMENTS

| JP | 3-37701 | 2/1991 |
|----|---------|--------|
| JP | 04-131909 | 5/1992 |
| JP | 11-188676 | 7/1999 |

OTHER PUBLICATIONS

A Decision of Patent Grant of Japanese Patent Application mailed Jan. 6, 2009 issued in Japanese Application No. 2007-280638 (including a verified translation thereof).

*Primary Examiner*—Khoi Tran
*Assistant Examiner*—Brian J Broadhead
(74) *Attorney, Agent, or Firm*—Drinker Biddle & Reath LLP (57) ABSTRACT

A controller for work piece-conveying robot having: a coordinate system storage section for storing one or more manual jog feed coordinate systems; a working area setting section for setting to a machine tool a working area to which the manual jog feed coordinate system is assigned; a hand position obtaining section for obtaining a current position of the robot hand at each specified sampling period; a determination section for determining whether or not the current position of the robot hand obtained by the hand position obtaining section is within the working area set by the working area setting section; and a coordinate system switching section for switching a present manual jog feed coordinate system to the manual jog feed coordinate system assigned to the working area if it is determined by the determination section that the current position of the robot hand is within the working area.

9 Claims, 5 Drawing Sheets

CONTROLLER OF WORK PIECE-CONVEYING ROBOT

CROSS REFERENCE TO RELATED APPLICATIONS

The present application claims the benefit of priority based on Japanese Patent Application No. 2007-280638, filed on Oct. 29, 2007, disclosure of which is incorporated herein in its entirety by reference.

BACKGROUND OF THE INVENTION

1. Field of the Invention

The present invention relates to a controller of a work piece-conveying robot for controlling the motion of a robot in supplying an unprocessed work piece to a machine tool or taking out a processed work piece from a machine tool.

2. Description of Related Art

In general, in a processing system using a robot comprising a numerically controlled machine tool and a robot provided with a robot hand for carrying out at least one of supplying and taking-out of a work piece to and from the numerically controlled machine tool, when a robot teaching operation is performed, a position is usually taught to the robot while a robot hand is being moved in a manual jog feed. In the manual jog feed of the robot hand, when the robot hand is in a specified working area, for example in a working area above a table for a work piece to be fixed in the machine tool, the teaching operation is simplified by performing the manual jog feed using a coordinate system that is parallel to the table in this working area, so that the coordinate system parallel to the table is often adopted as a manual jog feed coordinate system in this working area. There are one or more manual jog feed coordinate systems stored in a robot controller and distinguished by the number given to the respective coordinate system or by comments added to the coordinate system in order to be able to select and utilize a suitable one. When the robot teaching operation is to be performed, a manual jog feed coordinate system suitable to the working area in which the robot hand exists is selected, and is switched to other manual jog feed coordinate system as robot hand is moved to different working area. Switching of the coordinate system is performed by an operator who inputs the number of the appropriate coordinate system to be used via a teaching operation panel into a robot controller based on an identification information such as the number or the comments.

An example of conventional robot control method related to the present invention is known from the disclosure of Japanese Unexamined Patent Publication No. 03-37701 (JP-A-03-37701). In Japanese Unexamined Patent Publication No. 03-37701, from the lowermost line at lower right column of page 2 to the $7^{th}$ line from the bottom at upper left column of page 3, there is a description that "process 1 in which a servo controller is caused to store the designated operating area that is inputted by an operator in a working coordinate system designated on the basis of a reference coordinate system, process 2 in which the angle of the arm joint is detected for each sampling period, and the position of the hand tip is determined from the detected angle of the arm joint, process 3 in which it is determined, for each sampling period, whether or not the position of the hand tip of the robot is included in the designated operating area, and if it is determined that the position is included in the designated operating area, process 4 in which a command in accordance with the processing level set for the designated operating area is sent to the servo controller to control the motion of the robot, and if it is determined that the position is not included in the designated operating area, the teaching operation or the working operation of the robot is continued so as to repeat the procedure from process 2 to process 3".

Also, from the lines 2 to 10 of the lower right column of page 5, there is a description that "at the position of the tip of a robot hand while carrying out the teaching operation or working in a job, a monitoring area or a movement limiting area can be easily set at an arbitrary position as required by an operator freely in a plural orthogonal coordinate systems such that, when it is detected that the position of hand tip has entered into the designated operation area, the command signal in accordance with a preset processing level can be given to control the robot motion. Thus, advantageously, operability of the robot can be thereby improved, and safety can be assured against wrong motion of the robot".

In the conventional method, while the robot hand is being moved in manual jog feed in the robot teaching operation, an operator was required to switch the manual jog feed coordinate system to be used in accordance with the working area for carrying out the teaching operation, and the operator had to select and determine a suitable manual jog feed coordinate system each time from the number or the added comment of the manual jog feed coordinate systems stored in the controller. If the operator fails to switch the manual jog feed coordinate system and continues to use the manual jog feed coordinate system unsuitable to the working area to carry out the jog feed in the teaching operation, not only the motion of moving the robot hand in manual jog feed becomes complicated, but it may become sometimes necessary to go several points back to a teaching point and to switch the manual jog feed coordinate system and to do the manual jog feed operation over again. If, in switching the manual jog feed coordinate system, a wrong manual jog feed coordinate system is selected, the robot hand may be moved in the manual jog feed in an undesired direction or to an undesired position.

SUMMARY OF THE INVENTION

It is an object of the present invention to provide a controller for a work piece conveying robot which is capable of preventing the switching of the manual jog feed coordinate system from being neglected or a wrong manual jog feed coordinate system from being set, and thus is capable of carrying out the robot teaching operation efficiently and safely.

In order to attain the above object, in accordance with an aspect of the present invention, there is provided a controller for a work piece-conveying robot which controls the motion of a robot hand in a manual jog feed using a teaching operation panel used in an operation of the robot hand adapted to grasp a work piece, the robot hand being mounted at a tip of an arm of a robot which performs at least one of supplying and taking-out of the work piece to and from a machine tool, the controller comprising a coordinate system storage section for storing one or more manual jog feed coordinate systems which define a direction of the robot hand, a working area setting section for setting to the machine tool a working area to which one of the one or more manual jog feed coordinate systems stored in the coordinate system storage section is assigned, a hand position obtaining section for obtaining a current position of the robot hand at each specified sampling period, a determination section for determining whether or not the current position of the robot hand obtained by the hand position obtaining section is within the working area set by the working area setting section, and a coordinate system switching section for switching a present manual jog feed coordinate system to a manual jog feed coordinate system assigned by the working area setting section to the working area if it is determined by the determination section that the current position of the robot hand is within the working area.

In the controller for a work piece-conveying robot, the determination section can determine, during a manual jog feed operation of the robot hand, whether or not the robot hand is within the working area set by the working area setting section, and if it is determined that the robot hand is within the working area, the manual jog feed operation of the robot hand is stopped, and then, the present manual jog feed coordinate system can be switched automatically to the manual jog feed coordinate system assigned to the working area by the coordinate system switching section.

In the controller for a work piece-conveying robot, it is also possible to include a warning display section for displaying a warning message on a display of the teaching operation panel when the manual jog feed operation of the robot hand is stopped.

In the controller for a work piece-conveying robot, the controller may further include an image display section for displaying, on a display of the teaching operation panel, the manual jog feed coordinate system assigned to the working area and the relative positional relation of the robot hand to the surroundings, when the present manual jog feed coordinate system is switched by the coordinate system switching section to the manual jog feed coordinate system assigned to the working area by the coordinate system switching section.

In the controller for a work piece-conveying robot, the working area setting section can use coordinate data to set the working area, and the hand position obtaining section can obtain the position of the robot hand based on output data of servo motors that drive various axes of the robot.

In the controller for a work piece-conveying robot, the working area setting section can set the working area based on output data from one or more photoelectric sensors mounted on the machine tool or peripheral devices, and the hand position obtaining section can obtain the position of the robot hand based on the output data of the one or more photoelectric sensors.

In the controller for a work piece-conveying robot, the controller may further include an alarm sound generating section for generating alarm sound, when the present manual jog feed coordinate system is switched by the coordinate system switching section to the manual jog feed assigned to the working area.

In the controller for a work piece-conveying robot, the controller may further include a feed speed adjusting section for lowering a feed speed of the robot hand, when the present manual jog feed coordinate system is switched to the manual jog feed coordinate system assigned to the working area.

In the controller for a work piece-conveying robot, the manual jog feed coordinate system to be assigned to the working area can be obtained by communication with the controller of the machine tool.

In accordance with above construction, a current position of the robot hand is obtained by the hand position obtaining section, and, since, if it is determined by the determination section that the robot hand is within the specified working area of the machine tool, a present manual jog feed coordinate system is automatically switched to a manual jog feed coordinate system assigned to the working area, failure to switch the manual jog feed coordinate system or setting of a wrong manual jog feed coordinate system can be prevented. If, during the manual jog feed operation of the robot hand, it is determined that the robot hand is within the specified working area, the robot operation is stopped and the present manual jog feed coordinate system is automatically switched to a manual jog feed coordinate system assigned to the working area, so that a manual jog feed coordinate system suitable for an accurate and safe teaching operation can be used at any time. Thus, an operator does not need switching manually the manual jog feed coordinate system during manual jog feed in teaching operation of the robot. Therefore, selection of a wrong unsuitable manual jog feed coordinate system can be eliminated, and the teaching operation can be carried out efficiently and safely.

Since a warning message can be displayed or an alarm sound can be generated when the present manual jog feed coordinate system of the robot is switched or when the manual jog feed operation of the robot is stopped in order to switch the manual jog feed coordinate system, an operator can be alerted to recognize that a coordinate system assigned to the specified working area is applied as the manual jog feed coordinate system of the robot.

When the specified working area is set to the machine tool based on the coordinate data, the need of the measurement instruments for setting the working area can be eliminated. When the working area is set based on the output data from photoelectric sensors, the working area can be easily set, and an alteration of the working area can be flexibly accommodated.

By displaying, on the display of the teaching operation panel, an image showing the manual jog feed coordinate system being used and relative positional relation of the robot hand to the surroundings, the operator can visually confirm a newly selected manual jog feed coordinate system. When the manual jog feed coordinate system is switched, the speed override of the manual jog feed operation can be lowered so as to be able to stop the robot operation immediately even when the operator is unaware of the switching of the coordinate system.

By making it possible to obtain a manual jog feed coordinate system assigned to the working area by communicating with the machine tool or peripheral devices, the coordinate system need not be stored in the controller, and a load imposed on the controller can be reduced. As a result, when the machine tool or the peripheral device is replaced, the controller can accommodate to the alteration flexibly.

BRIEF DESCRIPTION OF THE DRAWINGS

The above and other objects, features and advantages of the present invention will become more apparent from following description of preferred embodiments with reference to appended drawings, in which.

DETAILED DESCRIPTION

Figure 1:
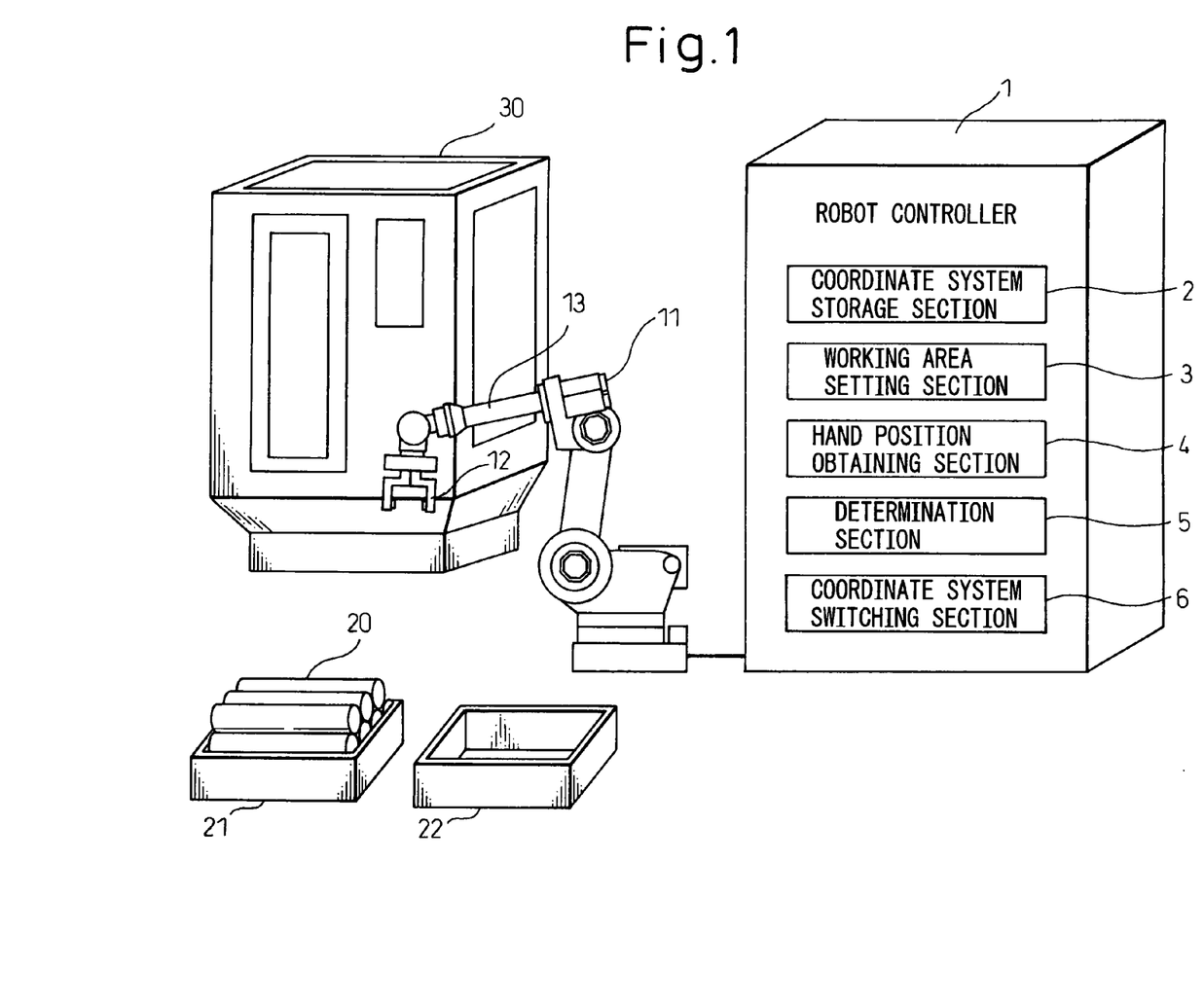
FIG. 1 is a view for explaining a controller according to an embodiment of the present invention.

The present invention will be described in detail below with reference to drawings. FIG. 1 is a view for explaining a controller according to an embodiment of the present invention. Controller 1 of this embodiment is not particularly limited in this embodiment, but is directed to controlling work piece conveying robot 11 that conveys cylindrical work pieces 20 between palettes 21, 22 and machine tool 30. A processing system using a robot includes controller 1, robot 11, and machine tool 30.

Machine tool 30 is shown as a vertical type machining center having work table 31 (see FIG. 3), but is not particularly limited in type, as long as a 3-dimensional working area can be defined thereon, and thus may include a turning center or a press machine. Work piece 20 is grasped by robot hand 12, and is conveyed from palette 21 containing unprocessed work pieces to work table 31 of machine tool 30. After processing of work piece 20 is completed, work piece 20 is conveyed from work table 31 to palette 22 containing processed work pieces. Robot hand 12 rotatably mounted on the tip of robot arm 13 is adapted to be controlled by robot controller 1 based on teaching data prepared in advance.

Figure 3:
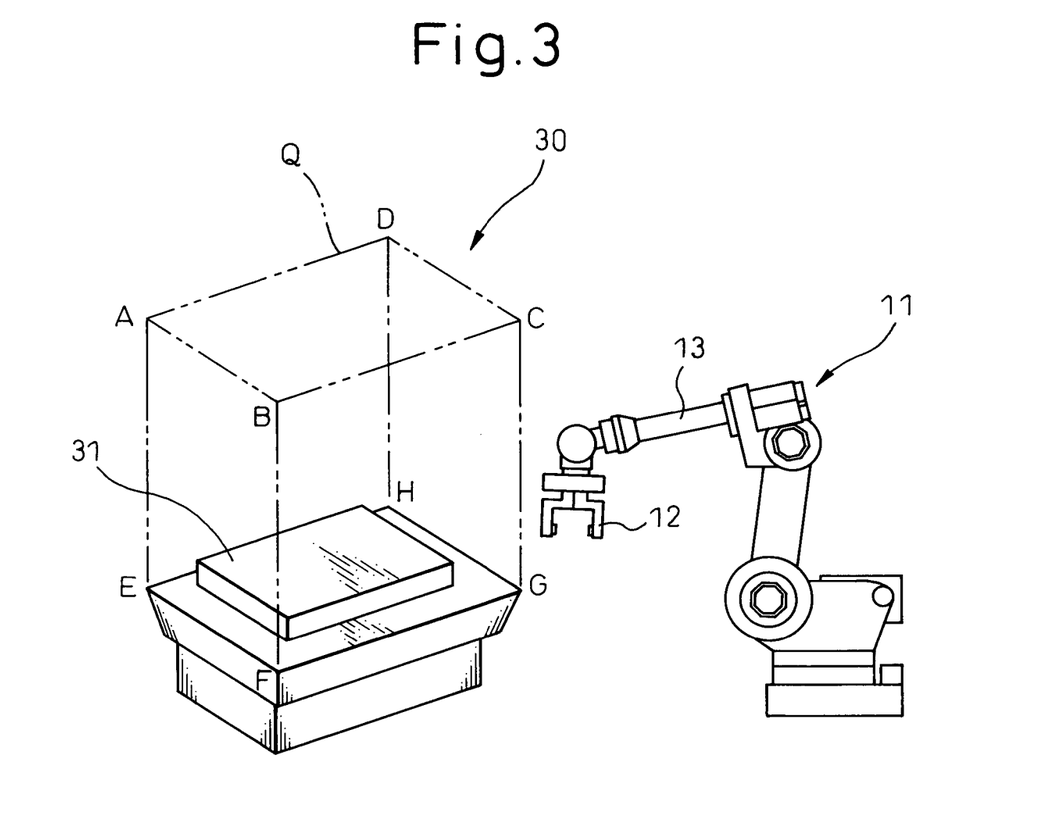
FIG. 3 is a view for explaining the working area defined above the table for fixing a work piece on a machine tool.

Work table 31 is constructed as X-Y table that is movable in two directions. The direction perpendicular to the X and Y directions is defined as the Z-axis of machine tool 30. When teaching robot 11 a motion of setting unprocessed work piece 20 on work table 31, or when teaching robot 11 a motion of taking-out a processed work piece from work table 31, the robot hand is operated in a manual jog feed in the working area Q above work table 31 as shown in FIG. 3 based on working coordinate system R (see FIG. 5) set in the moving directions of work table 31 or along each side of work table 31. The method for defining working area Q and working coordinate system R will be described later.

As shown in FIG. 1, robot controller 1 includes coordinate system storage section 2 for storing working coordinate system R as one of manual jog feed coordinate systems that define the direction of the manual jog feed of robot hand 12, working area setting section 3 for setting working area Q that associates (assigns) working coordinate system R to a set manual jog feed coordinate system, hand position obtaining section 4 for obtaining current position of robot hand 12, determination section 5 for determining whether or not the current position of robot hand 12 obtained by hand position obtaining section 4 is within working area Q, and coordinate system switching section 6 for automatically switching the manual jog feed coordinate system being used by robot 11 to the manual jog feed coordinate system in which working coordinate system R is set if it is determined by determination section 5 that the current position of robot hand 12 is within working area Q.

Working coordinate system R as used in this embodiment refers to the machine coordinate system proper to the machine tool. Although, in this embodiment, only one working coordinate system R is stored as the manual jog feed coordinate system, coordinate system storage section 2 can store unshown multiple coordinate systems. In this case, individual working coordinate systems can have identification symbols, and a specified coordinate system can be distinguished by this identification symbol.

Figure 2:
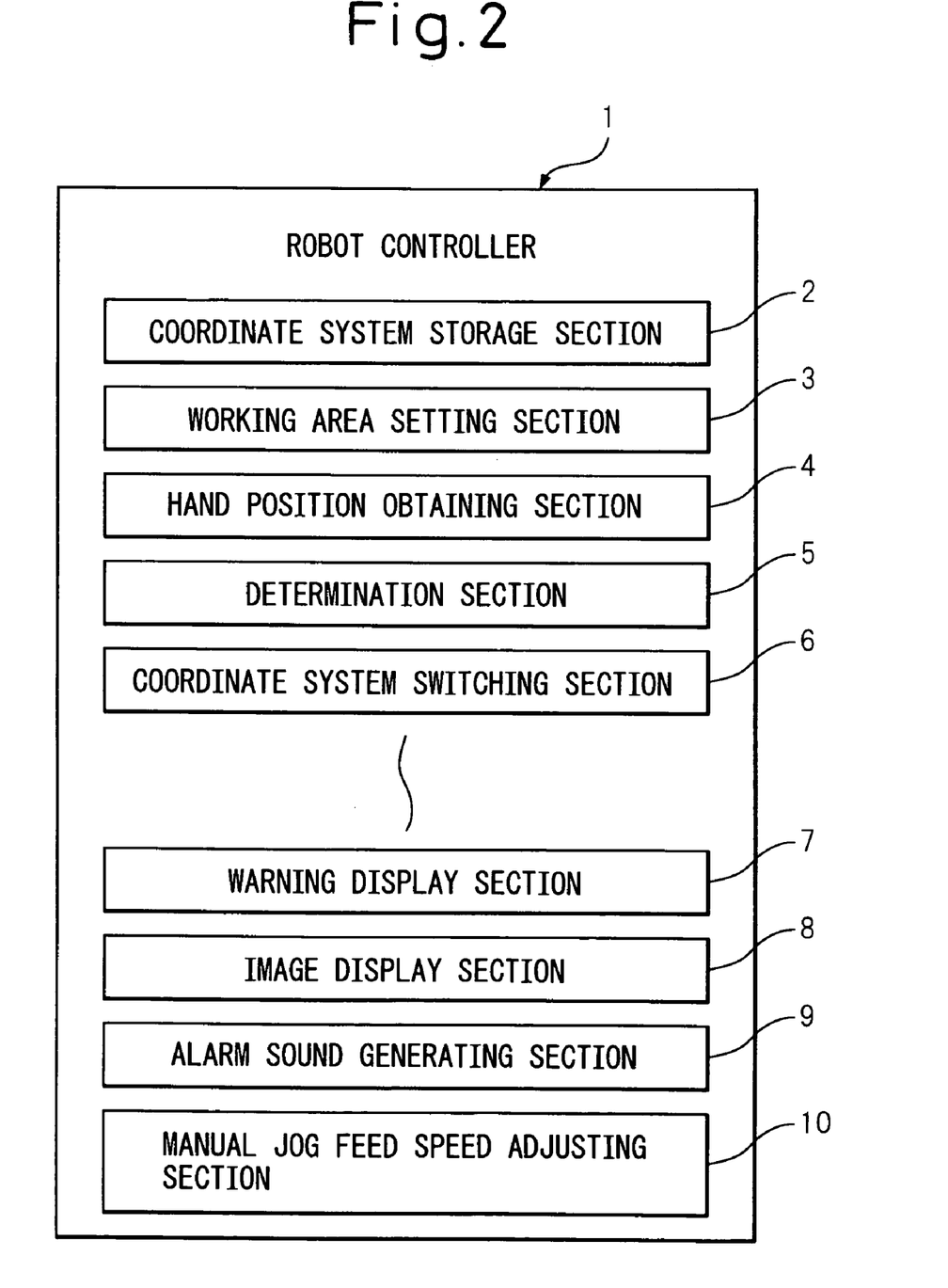
FIG. 2 is a detail view of the controller of FIG. 1.

It is also possible to construct controller 1 of this embodiment as shown in FIG. 2. Warning display section 7 is a means for displaying a warning message when the manual jog feed of robot hand 12 is stopped, and is implemented at step S5 in the flow chart of FIG. 6 to be described later. The warning message can be displayed on a display of a teaching operation panel (not shown) which operates robot hand 12 or on a display of robot controller 1.

Figure 6:
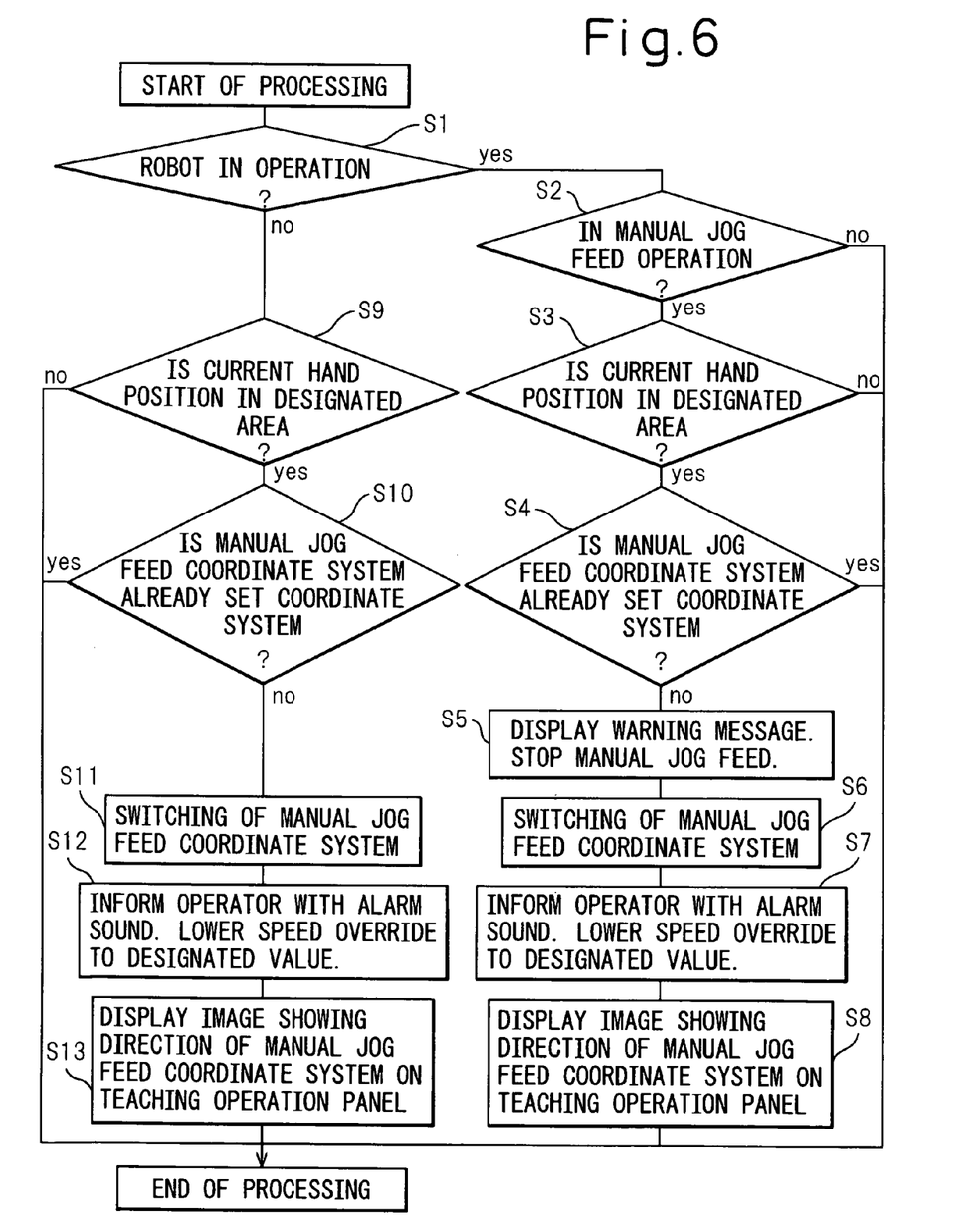
FIG. 6 is a flow chart for explaining the method for switching the manual jog feed coordinate system when the robot hand is positioned in the working area.

Image display section 8 is means for displaying working coordinate system R and relative position of robot hand 12 and the surroundings on the display of the teaching operation panel or on the display of robot controller 1, and is implemented at steps S8 and S13 in the flow chart of FIG. 6. Alarm sound generating section 9 is a means for generating an alarm sound when the manual jog feed coordinate system of robot hand 12 is switched to working coordinate system R, and is implemented at steps S7 and S12 in the flow chart of FIG. 6. Feed speed adjusting section 10 is means for lowering the speed override of the manual jog feed of robot hand 12 when the manual jog feed coordinate system of robot hand 12 is switched to working coordinate system R, and is implemented at steps S7 and S12 in the flow chart of FIG. 6 simultaneously with alarm sound generating section 9.

Next, working area Q above work table 31 will be described.

Figure 4:
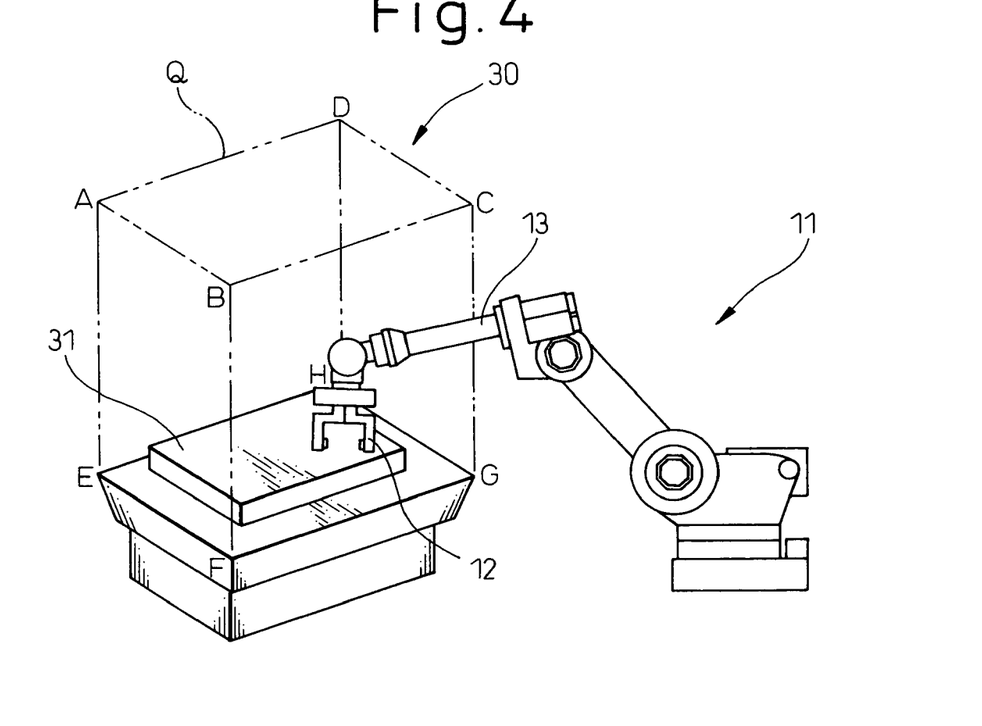
FIG. 4 is an explanatory view of a robot hand positioned in the working area shown in FIG. 3.

Working area Q above work table 31 is defined as shown in FIG. 3 or FIG. 4. FIG. 3 shows that hand 12 is positioned outside working area Q, and FIG. 4 shows that hand 12 is positioned inside working area Q. Working area Q is set as the space to which working coordinate system R is applied as the manual jog feed coordinate system of robot 11. Working area Q is defined by setting the coordinate values in the reference coordinate system of robot 11 for two diagonally opposing points from among vertices A-H. Since it is usually difficult to know the coordinate values in the reference coordinate system of the robot for an arbitrary point in space, the coordinate values are set by moving the center position of robot hand 12 to a specified position and by capturing the position into robot controller 1.

If it is difficult to recognize the center point of robot hand 12, a jig may be provided for setting, so that the coordinate value of the jig tip in the mechanical interface coordinate system can be set, and after robot 11 is moved so as to bring the jig tip to each vertex, the position can be captured into robot controller 1. If the coordinate values are known from drawings or the like in advance, the coordinate values can be inputted to set working area Q. It is possible to use other methods to set the working area, for example, by inputting the coordinate value for any one vertex from among vertices A-H shown in FIG. 3, and additionally inputting the distance to the diagonally opposing vertex in a direction of each axis of the reference coordinate system of the robot.

Next, methods for defining working coordinate system R as the manual jog feed coordinate system to be switched to in working area Q will be described. The coordinate system can be defined in either of two methods, that is, either by defining the relative relation to the reference coordinate system of the robot as the transformation matrix from the reference coordinate system to the coordinate system to be defined, or by defining the relative relation to the mechanical interface coordinate system. The former method is selected to define a coordinate system in which directions of axes do not change even when the attitude of the hand of robot 11 changes. The latter method is selected when it is desired to change the direction of coordinate system in accordance with the attitude of the hand.

Figure 5:
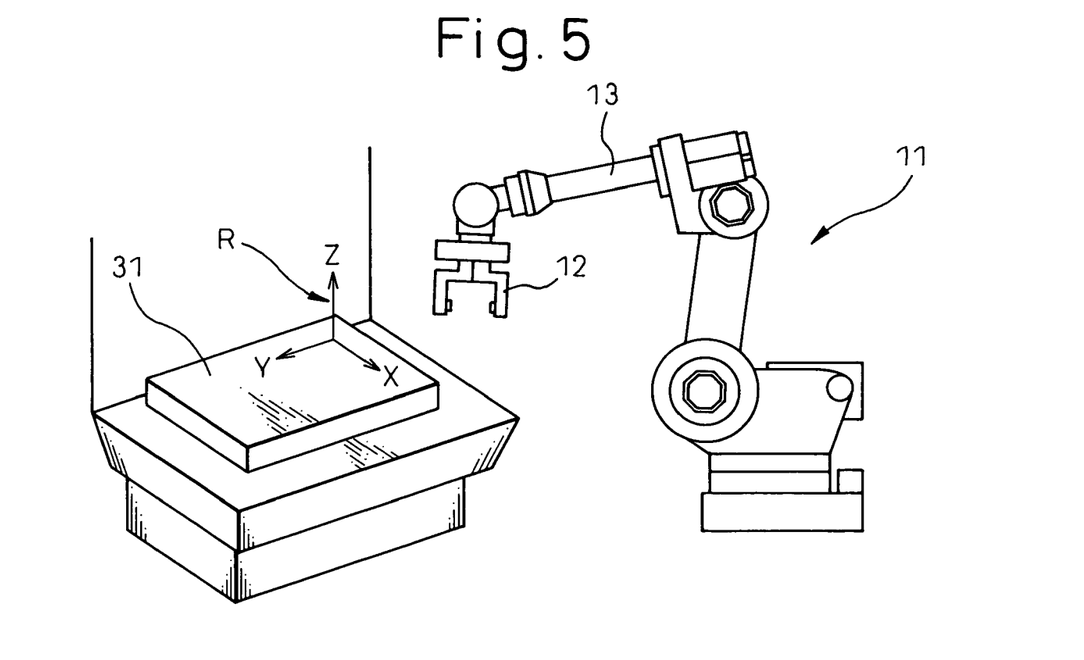
FIG. 5 is a view for explaining a working coordinate system on the table for fixing a work piece.

In this embodiment, since it is desired that a coordinate system proper to the machine tool can be used in defined working area Q, working coordinate system R is defined as the manual jog feed coordinate system by the former method to define the relative relation to the reference coordinate system of the robot. FIG. 5 shows working coordinate system R defined in this manner. Working coordinate system R is a X-Y-Z coordinate system with axes perpendicular to each other, and is defined as one of the manual jog feed coordinate systems of robot 11.

In the procedure for actually defining working coordinate system R as one of the manual jog feed coordinate systems, robot 11 is moved so as to bring the center point of hand 12 to the origin of the coordinate system to be defined, to an arbitrary point on X-axis, and to an arbitrary point on Y-axis, respectively, and to capture each point in robot controller 1. By using a jig in the same manner as in defining working area Q, the coordinate value of each point can be captured more accurately. By capturing these three points, the matrix that defines working coordinate system R as one of the manual jog feed coordinate systems can be calculated.

After working area Q has been set and working coordinate system R has been set as one of the manual jog feed coordinate systems in this manner, capture (monitoring) of the position of robot hand 12 in the manual jog feed during actual robot teaching operation is carried out. Capture of the position of robot hand 12 is performed by robot controller 1 at specified sampling period. When the position of robot hand 12 is to be obtained by calculation, output data from the encoders provided on the motors for driving various axes of robot 11 are used to calculate angles of various axes of robot 11, and these angles of various axes are used to calculate the center position of the mechanical interface. The hand center position in the mechanical interface coordinate system is usually set in advance at the time of mounting the hand 12 in order to control the position and attitude of hand 12 so that the hand center position can be obtained in the reference coordinate system of the robot. If the hand center position in the mechanical interface coordinate system is not set in advance, the hand center position in the reference coordinate system of the robot cannot be calculated, and therefore, it needs to be set before starting the monitoring of the hand position of robot 11.

Next, processing to be carried out periodically from the start of the monitoring of the hand position of robot 11 will be described with reference to FIG. 6.

First, at step S1, it is checked whether or not robot 11 is in operation. If the robot 11 is in operation, processing proceeds to step S2, and if the robot 11 is not in operation, processing proceeds to step S9. At step S2, if the robot operation is an operation in a manual jog feed, processing proceeds to step S3, and if the robot operation is not an operation in a manual jog feed, processing is terminated. At step S3, current position of hand 12 is obtained by position obtaining section 4, and it is determined by determination section 5 whether or not hand 12 is within working area Q defined in advance. Here, if plural working areas other than working area Q are defined for which the manual jog feed coordinate systems are switched, the determination is performed on all of the defined working areas.

At step S4, if the hand position is within any of defined work areas Q, it is checked whether or not the current manual jog feed coordinate system is the same as working coordinate system R assigned to working area Q. If, as a result, it is found that switching of the manual jog feed coordinate system is not necessary, processing is terminated. If switching of the manual jog feed coordinate system is necessary, at step S5, a warning message is displayed by warning display section 7, and at the same time, the manual jog feed operation of robot 11 is stopped. And at step S6, the manual jog feed coordinate system being used are altered to the manual jog feed coordinate system to which working coordinate system R assigned to working area Q is set. At step S7, with the alteration of the manual jog feed coordinate system, an alarm sound is generated by alarm sound generating section 9, and the alteration of the manual jog feed coordinate system is informed to the user, and the speed override of the manual jog feed operation is lowered by manual jog feed speed adjusting section 10. Finally, at step S8, an image showing working coordinate system R is displayed on the teaching operation panel, and processing is terminated. With regard to the alteration of the speed override by manual jog feed speed adjusting section 10, if current speed override is lower than the preset speed override, the speed override is not lowered further.

On the other hand, if the robot 11 is not in operation, at step S9, current position of hand 12 is obtained by the hand position obtaining section 4, and it is determined by the determination section 5 whether or not the hand 12 is within the working area Q defined in advance (see FIG. 4). Here, if plural working areas other than the working area Q are defined for which the manual jog feed coordinate system are switched, the determination is performed on all of the defined working areas.

At step S10, if the hand position is within any of the defined working areas Q, it is checked that the manual jog feed coordinate system being used is same as working coordinate system R assigned to working area Q. If, as a result, it is found that switching of the manual jog feed coordinate system is not necessary, processing is terminated. If it is found that switching of the manual jog feed coordinate system is necessary, at step S11, the manual jog feed coordinate system being used is altered to the manual jog feed coordinate system in which working coordinate system R assigned to working area Q is set. At step S12, with the alteration of the manual jog feed coordinate system, an alarm sound is generated by alarm sound generating section 9, and the alteration of the manual jog feed coordinate system is informed to the user, and the speed override of the manual jog feed operation is lowered by manual jog feed speed adjusting section 10. Finally, at step S13, an image showing working coordinate system R is displayed on the teaching operation panel, and processing is terminated. It is possible to select setting such that generation of an alarm sound, change of speed override, and display of an image showing a direction of coordinate system, are omitted.

By repeatedly conducting the processing at steps S2-S8, or processing at steps S9-S13 at specified sampling interval, the position of the robot hand is monitored at any time. When the position of the robot hand is in designated working area Q, the manual jog feed coordinate system can be automatically switched to the specified coordinate system while ensuring safety of the operator.

The present invention is by no means limited to the embodiment as described above, but can be implemented in various modifications without departing from the scope and spirit of the present invention. Although the working area setting section 3 of this embodiment uses the coordinate data to set working area Q, it is also possible to set working area Q based on the output data from one or more photoelectric sensors mounted on machine tool 30 or the peripheral devices. Although hand position obtaining section 4 obtains the position of robot hand 12 based on the output data of servo motors driving various axes of robot 11 in this embodiment, it is also possible to obtain the position of robot hand 12 based on the output data from one or more photoelectric sensors mounted on machine tool 30 or the peripheral devices.

The invention claimed is:

1. A controller for work piece-conveying robot that controls a motion of a robot hand in a manual jog feed by using a teaching operation panel used for an operation of said robot hand adapted to grasp a work piece, said robot hand being mounted to a tip of an arm of a robot which carries out at least one of supplying and taking-out of said work piece to and from a machine tool, said controller comprising:

a coordinate system storage section for storing one or more manual jog feed coordinate systems which define a direction of said manual jog feed of said robot hand;

a working area setting section for setting to said machine tool a working area to which one of said one or more manual jog feed coordinate systems stored in said coordinate system storage section is assigned;

a hand position obtaining section for obtaining a current position of said robot hand at each specified sampling period;

a determination section for determining whether or not said current position of said robot hand obtained by said hand position obtaining section is within said working area set by said working area setting section; and, a coordinate system switching section for switching a present manual jog feed coordinate system to a manual jog feed coordinate system assigned to said working area if it is determined by said determination section that said current position of said robot hand is within said working area.

2. A controller for work piece-conveying robot according to claim 1, wherein said determination section determines, during a manual jog feed operation of said robot hand, whether or not said robot hand is in said working area set by said working area setting section, and if it is determined that said robot hand is in said working area, said manual jog feed operation of said robot hand is stopped, and then, said present manual jog feed coordinate system is automatically switched by said coordinate system switching section to said manual jog feed coordinate system assigned to said working area.

3. A controller for work piece-conveying robot according to claim 2, further comprising a warning display section for displaying a warning message on a display of said teaching operation panel when said manual jog feed operation of said robot hand is stopped.

4. A controller for work piece-conveying robot according to claim 1, further comprising an image display section which, when said present manual jog feed coordinate system is switched to said manual jog feed coordinate system assigned to said working area, displays on a display of said teaching operation panel said manual jog feed coordinate system assigned to said working area and a relative positional relationship of said robot hand to surroundings.

5. A controller for work piece-conveying robot according to claim 1, wherein said working area setting section uses coordinate data to set said working area, and said hand position obtaining section obtains said present position of said robot hand based on output data of servo motors which drive various axes of said robot.

6. A controller for work piece-conveying robot according to claim 1, wherein said working area setting section uses output data from one or more photoelectric sensors mounted on said machine tool or peripheral devices to set said working area, and said hand position obtaining section obtains said present position of said robot hand based on output data of said one or more photoelectric sensors.

7. A controller for work piece-conveying robot according to claim 1, further comprising an alarm sound generating section for generating an alarm sound, when said present manual jog feed coordinate system is switched by said coordinate system switching section to said manual jog feed coordinate system assigned to said working area.

8. A controller for work piece-conveying robot according to claim 1, further comprising a feed speed adjusting section for lowering a feed speed of said robot hand, when said present manual jog feed coordinate system is switched by said coordinate system switching section to said manual jog feed coordinate system assigned to said working area.

9. A controller for work piece-conveying robot according to claim 1, wherein said present manual jog feed coordinate system assigned to said working area is obtained by communication with a controller of said machine tool.

* * * * *